United States Patent
Hwang et al.

(10) Patent No.: US 6,521,375 B1
(45) Date of Patent: Feb. 18, 2003

(54) ELECTROLYTE FOR RECHARGEABLE LITHIUM BATTERY EXHIBITING GOOD CYCLE LIFE CHARACTERISTICS AND RECHARGEABLE LITHIUM BATTERY USING SAME

(75) Inventors: Duck-Chul Hwang, Chungcheongnam-do (KR); Eui-Hwan Song, Chungcheongnam-do (KR); Won-Il Jung, Chungcheongnam-do (KR); Ho-Jin Kweon, Chungcheongnam-do (KR)

(73) Assignee: Samsung SDI Co., Ltd., Suwon-si (KR)

( * ) Notice: Subject to any disclaimer, the term of this patent is extended or adjusted under 35 U.S.C. 154(b) by 143 days.

(21) Appl. No.: 09/649,115

(22) Filed: Aug. 28, 2000

(30) Foreign Application Priority Data

Sep. 16, 1999 (KR) .............................. 99-39887

(51) Int. Cl.$^7$ .......................... H01M 6/04; H01M 4/58; H01M 6/16
(52) U.S. Cl. .................. 429/188; 429/231.95; 429/324; 429/326; 429/338
(58) Field of Search ................... 429/329, 326, 429/338, 231.95, 188

(56) References Cited

U.S. PATENT DOCUMENTS

| | | | |
|---|---|---|---|
| 5,437,945 A | | 8/1995 | Omaru et al. ............... 429/197 |
| 5,474,862 A | | 12/1995 | Okuno et al. ............... 429/197 |
| 5,612,155 A | * | 3/1997 | Takami et al. ............... 429/218 |
| 5,648,011 A | * | 7/1997 | Blonsky ..................... 252/62.2 |
| 5,658,689 A | * | 8/1997 | Kawakami et al. .......... 429/194 |
| 5,998,065 A | * | 12/1999 | Tsutsumi et al. ........... 429/328 |

FOREIGN PATENT DOCUMENTS

| | | | | |
|---|---|---|---|---|
| JP | 3-236170 | * | 10/1991 | .......... H01M/10/26 |
| JP | 9-283156 | * | 10/1997 | ............ H01M/6/18 |
| JP | 2001-110444 | * | 4/2001 | .......... H01M/10/40 |

OTHER PUBLICATIONS

"Does Oil Remain on the Beaches 10 Years Later?", Exxon Valdez Oil Spill Trustee Council 10–Year Report.*

* cited by examiner

*Primary Examiner*—Patrick Ryan
*Assistant Examiner*—Julian Mercado
(74) *Attorney, Agent, or Firm*—Christie, Parker & Hale, LLP

(57) ABSTRACT

Disclosed is an electrolyte for a rechargeable lithium battery. The electrolyte includes non-aqueous solvent and silicon powder. Silicon powder reacts with hydrogen halide produced by reacting a solute with water, thereby removing the hydrogen halide. The solvent may be an organic solvent such as a cyclic or chain carbonates, or a mixture thereof. The amount of silicon powder is 0.01 to 5 wt % of the organic solvent.

10 Claims, 1 Drawing Sheet

ELECTROLYTE FOR RECHARGEABLE LITHIUM BATTERY EXHIBITING GOOD CYCLE LIFE CHARACTERISTICS AND RECHARGEABLE LITHIUM BATTERY USING SAME

CROSS REFERENCE TO RELATED APPLICATION

This application is based on application Ser. No. 1999-39887 filed in the Korean Industrial Property Office on Sep. 16, 1999, the content of which is incorporated herein by reference.

BACKGROUND OF THE INVENTION (a) Field of the Invention

The present invention relates to an electrolyte for a rechargeable lithium battery and a rechargeable lithium battery using the same and, more particularly, to an electrolyte for a rechargeable lithium battery exhibiting good cycle life characteristics.

(b) Description of the Related Art

In recent years, the development of miniaturized portable electronics has increased the needs for rechargeable batteries having a high capacity as well as a light weight. From the viewpoint of the capacity improvement per unit weight, the rechargeable lithium battery is superior to other types of rechargeable batteries because of the advantageous properties of lithium. That is, lithium has a high standard potential as well as a low electrochemical equivalent weight.

Metallic lithium has been used for the negative active material in a rechargeable lithium battery. However, during charging, lithium is electroplated onto the metallic lithium electrode, it deposits to form a dendric layer which induces a short circuit between the negative and positive active material. The problem of lithium reactivity toward the electrolyte is addressed by replacing lithium metal with carbon-based materials.

For the positive active material in the rechargeable lithium battery, transition metal oxides are used. Typical examples include $LiCoO_2$, $LiMn_2O_4$, $LiNiO_2$, $LiNi_{1-x}Co_xO_2$ (0<X<1) or $LiMnO_2$. Manganese-based material such as $LiMn_2O_4$ or $LiMnO_2$ is easiest to prepare, is less expensive than the other materials and has environmentally friendly characteristics, but it has low capacities. In particularly, $LiMn_2O_4$ has a lower discharge capacity than $LiCoO_2$ and $LiNiO_2$, experiences an abrupt drop in discharge capacity at high charge and discharge rates, and exhibits inferior cycle life characteristics due to the dissolution of manganese at high temperatures. $LiCoO_2$ is widely used as it has a good electrical conductivity and high battery voltage, but it is expensive. $LiNiO_2$, on the other hand, is relatively inexpensive and has a high charge capacity, but it is difficult to produce and has safety problems.

The electrochemical performances of rechargeable lithium batteries depend on the reaction between the positive active material and an electrolyte or between the negative active material and an electrolyte, and thus the choice of an organic solvent in the electrolyte is critical to battery performance. There have been attempted to use various non-aqueous organic solvents for electrolytes. It is understood that an organic solvent is used alone, rechargeable lithium batteries exhibit no excellent electrochemical performances, and thus, two or three-component is used for electrolytes.

In the lithium ion battery, cycle life and capacity greatly depend on the surface reactivity between the electrolyte and the negative active material. Accordingly, the reactivity between the electrolyte and the negative active material, rather than the positive active material, should be considered when developing the electrolyte composition.

It has been proposed in U.S. Pat. No. 5,437,945 (Sony) to use a two-component for electrolytes. The electrolyte includes propylene carbonate and methyl ethyl carbonate. In addition, U.S. Pat. No. 5,474,862 (Matsushita) describes an electrolyte including aliphatic carbonate, cyclic carbonate and chain carbonate. Propylene carbonate exhibits good low-temperature characteristics, but the reduced cycle life characteristics.

Because rechargeable lithium batteries use non-aqueous solvents, no water exists in the electrolyte. However, a trace of water may exist as an impurity in the electrolyte. Water reacts with lithium salts in the electrolyte to generate acidic materials such as hydrogen halide (HX: X is halogen). Such acidic materials cause damage to a surface of the positive electrode and a surface of a passivation layer of the negative electrode, thereby deteriorating cycle life characteristics.

SUMMARY OF THE INVENTION

It is an object of the present invention to provide an electrolyte for a rechargeable lithium battery exhibiting good cycle life characteristics.

It is another object of the present invention to provide the electrolyte for a rechargeable lithium battery exhibiting good safety characteristics.

These and other objects may be achieved by an electrolyte for a rechargeable lithium battery. The electrolyte includes silicon powder and a non-aqueous organic solvent. Silicon powder has good reactivity with hydrogen halide.

The present invention further provides a rechargeable lithium battery including an electrolyte including silicon powder and a non-aqueous organic solvent, a negative electrode formed with a resin binder and graphitic carbonaceous material from or into which lithium ions are deintercalated or intercalated as a negative active material, and a positive electrode formed with transition metal oxides from or into which lithium ions are deintercalated or intercalated as a positive active material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
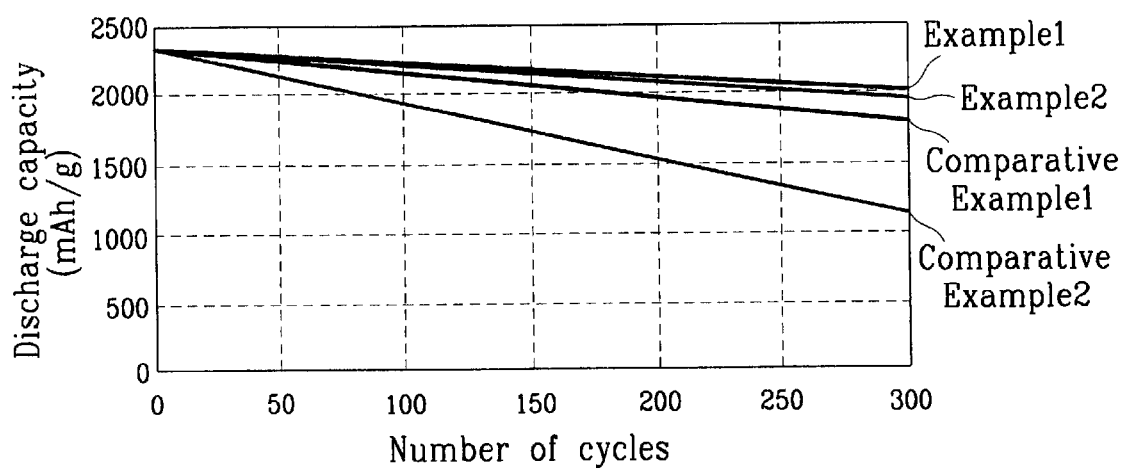
FIG. 1 is a graph illustrating cycle life characteristics of cells according to Examples 1 and 2 and Comparative examples 1 and 2.

An electrolyte of the present invention includes a non-aqueous solvent and silicon powder. The non-aqueous solvent may be an organic solvent such as a cyclic or chain carbonate, or a mixture thereof. The examples thereof are ethylene carbonate, dimethyl carbonate, diethyl carbonate, ethyl methyl carbonate, or propylene carbonate. It is preferably to use a first mixture of ethylene carbonate (EC), dimethyl carbonate (DMC), and propylene carbonate (PC); a second mixture of EC, ethyl methyl carbonate (EMC), and PC; or a third mixture of EC, diethyl carbonate (DEC), and PC. The volume ratio of EC: DMC (EMC or DEC): PC is preferably 20 to 60:20 to 70:5 to 20. If the volume ratio is not within this range, the cycle life and low-temperature characteristics of the battery are deteriorated.

Silicon powder has good reactivity with hydrogen halide. Accordingly, when silicon powder is added to the electrolyte, it reacts with hydrogen halide, and thus no hydrogen halide presents in the electrolyte. Hydrogen halide is generated by the reaction of a solute including halogen with water in the battery. Hydrogen halide damages a surface of a positive electrode and a passivation film formed on a surface of a negative electrode, thereby causing a decrease in charge and discharge efficiency. This ultimately results in a deterioration of the cycle life characteristics of the battery.

Although there is preferably no water in the rechargeable lithium battery so that a reaction between lithium and water does not occur, a trace of water may be present as an impurity in the electrolyte as well as in the positive and negative electrodes. Prior to battery fabrication, a small amount of water in range of tens of ppm is present in the electrolyte. This amount is small enough to cause no serious problems. However, after battery fabrication, hundreds of ppm of water present in the electrodes may be added to water already in the electrolyte. That is, the amount of water in the electrolyte is significantly increased.

In the present invention, silicon powder is added to the organic solvent to remove hydrogen halide which deteriorates the cycle life characteristics of the battery as described above. The amount of silicon powder is 0.01 to 5 wt % of the non-aqueous organic solvent. If the silicon powder is not within this range, the capacity and the cycle life characteristics of the battery are deteriorated.

The electrolyte further includes a supporting solute. The examples thereof are lithium hexafluorophosphate ($LiPF_6$), lithium tetrafluoroborate ($LiBF_4$), lithium hexafluoroasenate ($LiAsF_6$), lithium perchlorate ($LiClO_4$), lithium trifluoromethanesulfonate ($CF_3SO_3Li$) or a mixture thereof. The concentration of the supporting solute is preferably 0.5 to 2.0 M. If the concentration is not within this range, the cycle life characteristics of the battery are deteriorated.

The electrolyte is used in a rechargeable lithium battery. The rechargeable battery includes a negative electrode, a positive electrode, and the electrolyte. The negative electrode is produced by using a resin binder and graphitic carbonaceous negative active material from or into which lithium ions are deintercalated or intercalated. The negative active material has a crystallinity size in the direction of the c axis of Lc of 20 nm or more, and an exothermic peak at a temperature of 700° C. or more. The negative active material is prepared by carbonizing mesophase globular particles and graphitizing the carbonized particles. Alternatively, the negative active material is prepared by carbonizing mesophase pitch fiber and graphitizing the carbonized fiber.

The positive electrode is produced by using transition metal oxide from or into which lithium ions are deintercalated or intercalated. The examples thereof are $LiCoO_2$, $LiNi_{1-x-y}Co_xM_yO_2$ ($0<x<0.2$, $0.001<y<0.02$, and where M is selected from Mg, Ca, Sr, Ba, or La.), $LiMnO_2$ or $LiMn_2O_4$.

With the application of the electrolyte of the present invention, which includes silicon powder that reacts with hydrogen halide at high temperatures, the cycle life characteristics are not deteriorated.

The following examples further illustrate the present invention.

EXAMPLES 1–2 AND COMPARATIVE EXAMPLES 1–2

The composition of organic solvents in electrolytes according to Examples 1 and 2 and Comparative examples 1 and 2 are shown in Table 1. The electrolyte according to Examples I and 2 included 1 wt % of Si powder (Aldrich., Co.), whereas the electrolyte according to Comparative examples 1 and 2 included no Si powder. The electrolytes according to Examples 1 and 2 and Comparative examples 1 and 2 included 1M $LiPF_6$. $LiNi_{1-x-y}Co_xSr_yO_2$ ($x=0.1$, $y=0.002$) was used as a positive active material to produce a positive electrode, and artificial graphite (manufactured by Kawasaki Co., under KMFC) was used as a negative active material was used to produce a negative electrode.

Each of the positive and negative electrodes was assembled with the electrolyte to fabricate a 18650 cell. The cycle life characteristics of the cells according to Examples 1 and 2 and Comparative examples 1 and 2 were measured and the results are presented in FIG. 1. As shown in FIG. 1, the cells of Examples 1 and 2 exhibited better cycle life characteristics than the cells of Comparative examples 1 and 2. The initial discharge capacity, cycle life characteristics after 300 charge and discharge cycles, and the low-temperature characteristics (−20° C.) were measured and the results are shown in Table 1.

TABLE 1

|  | Composition [V %] | Initial discharge capacity [mAh/g] | Cycle life characteristics [after 300 cycles] | Low-temperature characteristics* |
|---|---|---|---|---|
| Comparative example 1 | EC/DMC (50/50) | 2321 | 78% | 20% |
| Comparative example 2 | EC/DMC/PC (45/45/10) | 2315 | 50% | 60% |
| Example 1 | EC/DMC/PC (45/45/10) | 2309 | 88% | 63% |
| Example 2 | EC/EMC/PC (45/45/10) | 2305 | 85% | 61% |

*percentages are represented by the capacity at −20° C. to that at room temperature (0.5 C. charging and 0.2 C. discharging)

As shown in Table 1, the cell of Comparative example 1, which does not contain PC, exhibited inferior low-temperature characteristics, and the cell of Comparative example 2 with PC exhibited good low-temperature characteristics but reduced cycle life characteristics. On the other hand, the cells of Examples 1 and 2 in which silicon powder removes HF produced by reacting $LiPF_6$ with water, exhibited good cycle life characteristics. In addition, the cells of Examples 1 and 2 exhibited good low-temperature characteristics, even with the use of PC in the electrolyte.

The electrolyte of the present invention includes silicon powder which reacts with hydrogen halide to remove the same. Accordingly, the electrolyte can prevent surface damage to the positive electrode and the passivation layer of the negative electrode caused by hydrogen halide, and acts to induce good cycle life characteristics and good low-temperature characteristics for the battery to which it is applied.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a rechargeable lithium battery comprising Si powder; and a non-aqueous organic solvent.

2. The electrolyte of claim 1 wherein the organic solvent is an organic solvent mixture selected from the group consisting of a first mixture comprising ethylene carbonate, dimethyl carbonate and propylene carbonate; a second mixture comprising ethylene carbonate, ethyl methyl carbonate and propylene carbonate; and a third mixture comprising ethylene carbonate, diethyl carbonate and propylene carbonate.

3. The electrolyte of claim 2 wherein the volume ratio of ethylene carbonate, dimethyl carbonate and propylene carbonate of the first mixture; ethylene carbonate, ethyl methyl carbonate and propylene carbonate of the second mixture; and ethylene carbonate, diethyl carbonate and propylene carbonate of the third mixture ranges from 20:60:20 to 70:5:20.

4. The electrolyte of claim 1 wherein the amount of Si powder ranges from 0.01 to 5 wt % based on the weight of the organic solvent.

5. The electrolyte of claim 1 wherein the electrolyte further comprises a supporting solute selected from the group consisting of lithium hexafluorophosphate ($LiPF_6$), lithium tetrafluoroborate ($LiBF_4$), lithium hexafluoroarsenate ($LiAsF_6$), lithium perchlorate ($LiClO_4$), and lithium trifluoromethanesulfonate ($CF_3SO_3Li$).

6. The electrolyte of claim 5 wherein the supporting solute has a concentration ranging from 0.5 to 2.0 M.

7. A rechargeable lithium battery comprising:
   an electrolyte including Si powder and a non-aqueous organic solvent;
   a negative electrode comprising a resin binder and a negative active material comprising graphitic carbonaceous material from or into which lithium ions are deintercalated or intercalated; and
   a positive electrode comprising a positive active material comprising transition metal oxides from or into which lithium ions are deintercalated or intercalated.

8. The rechargeable lithium battery of claim 7 wherein the negative active material has a crystallinity size in the direction of the c axis of Lc of 20 nm and an exothermic peak at a temperature of at least 700° C.

9. The rechargeable lithium battery of claim 7 wherein the graphitic carbonaceous material is selected from carbonized graphitized mesophase globular particles and carbonized mesophase pitch fiber.

10. The rechargeable lithium battery of claim 7 wherein the positive active material is selected from the group consisting of $LiCoO_2$, $LiNi_{1-x-y}Co_xM_yO_2$ wherein $0<x<0.2$, $0.001<y<0.02$ and M is selected from the group consisting of Mg, Ca, Sr, Ba and La, $LiMnO_2$ and $LiMn_2O_4$.

* * * * *